United States Patent
Lonkar

(10) Patent No.: US 11,722,886 B2
(45) Date of Patent: Aug. 8, 2023

(54) STATIC IP HANDLING PER ACCESS POINT NAME

(71) Applicant: T-Mobile USA, Inc., Bellevue, WA (US)

(72) Inventor: Shon Lonkar, Maple Valley, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 17/477,149

(22) Filed: Sep. 16, 2021

(65) Prior Publication Data

US 2022/0007177 A1 Jan. 6, 2022

Related U.S. Application Data

(62) Division of application No. 16/793,471, filed on Feb. 18, 2020, now Pat. No. 11,134,374.

(51) Int. Cl.
| | |
|---|---|
| *H04W 8/26* | (2009.01) |
| *H04W 36/00* | (2009.01) |
| *H04L 12/14* | (2006.01) |
| *H04W 48/08* | (2009.01) |
| *H04L 61/5007* | (2022.01) |
| *H04L 101/375* | (2022.01) |

(52) U.S. Cl.
CPC .......... *H04W 8/26* (2013.01); *H04L 12/1407* (2013.01); *H04L 61/5007* (2022.05); *H04W 36/0011* (2013.01); *H04W 48/08* (2013.01); *H04L 2101/375* (2022.05)

(58) Field of Classification Search
CPC ... H04W 8/26; H04W 36/0011; H04W 48/08; H04W 4/24; H04W 8/20; H04W 48/02; H04W 48/17; H04L 12/1407; H04L 61/5007; H04L 2101/375; H04L 61/5014; H04L 61/4523; H04L 61/5061; H04M 15/66; H04M 15/8033

See application file for complete search history.

(56) References Cited

U.S. PATENT DOCUMENTS

| | | |
|---|---|---|
| 11,134,374 B2 | 9/2021 | Lonkar |
| 2010/0202351 A1* | 8/2010 | Xi .................. H04L 61/4588 370/328 |
| 2012/0246325 A1 | 9/2012 | Pancorbo Marcos |
| 2014/0141743 A1 | 5/2014 | Shaw |
| 2014/0153544 A1* | 6/2014 | Lu ..................... H04W 8/26 370/331 |
| 2014/0185490 A1 | 7/2014 | Holm |

(Continued)

OTHER PUBLICATIONS

Notice of Allowance dated May 26, 2021 for U.S. Appl. No. 16/793,471 (pp. 1-10).

*Primary Examiner* — Hashim S Bhatti
(74) *Attorney, Agent, or Firm* — Loeb & Loeb LLP

(57) ABSTRACT

A cellular communication system uses a policy control rule function (PCRF) to allow or deny a particular user or user group access to a given access point name (APN). An allowed APN may support static IP address assignment for that user/user group. By restricting requested APNs via a test in the PCRF, frequent changes to the user's home service server (HSS)/home location registry (HLR) supporting static IP address can be avoided while ensuring that designated users will have access to an APN that supports the needed IP address pool.

16 Claims, 7 Drawing Sheets

(56) References Cited

U.S. PATENT DOCUMENTS

| | | | |
|---|---|---|---|
| 2015/0350912 A1* | 12/2015 | Head | H04L 63/08 |
| | | | 726/4 |
| 2018/0220009 A1 | 8/2018 | Alvarez Dominguez | |
| 2019/0028926 A1* | 1/2019 | Kawasaki | H04W 76/20 |
| 2021/0258770 A1 | 8/2021 | Shon | |
| 2021/0400535 A1* | 12/2021 | Hoewisch | H04W 8/26 |

* cited by examiner

STATIC IP HANDLING PER ACCESS POINT NAME

CROSS-REFERENCE TO RELATED APPLICATIONS

This is a Divisional Application of U.S. application Ser. No. 16/793,471, filed on Feb. 18, 2020, whose entire disclosure is incorporated by reference herein.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some applications, services in a cellular communication environment defined at a policy charging rules function (PCRF) are shared with multiple user groups over several access point names. In some cases, a particular user group may need to be restricted to a single a access point name (APN), for example, when a static IP address is required. While these restrictions may be implemented at home subscriber server (HSS) or home location register (HLR), many cases, changes at the HSS/HLR may not be possible or practical across the required user groups.

SUMMARY

In a communication network, every data session request will receive an IP address dynamically assigned from an IP pool maintained at a network core. However, users requiring static IP addresses must receive the same IP address each time the user connects to the network and cannot receive a dynamically assigned IP addresses. To aid in this, the user equipment may be hardcoded with a specific APN allowing the packet core that assigns the static IP address can identify the session request and supply the correct IP address. However, adding or changing static IP address capability may occur frequently and should not affect any existing service experiences. For this reason, making APN restrictions to support static IP addresses for individual users or groups via HSS or HLR is not practical.

An access point name control solution may be used to restrict user groups to a single APN when the user group is supported across multiple APNs. APN restrictions may be enforced at call provisioning using the PCRF to allow or deny an particular APN for a given user.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Features are provisioned for a subscriber device and stored, for example, at a unified data repository. When a session is initiated, the PCRF may perform a light data access protocol (LDAP) query at a unified data repository (UDR) for features available to that user.

Figure 1:
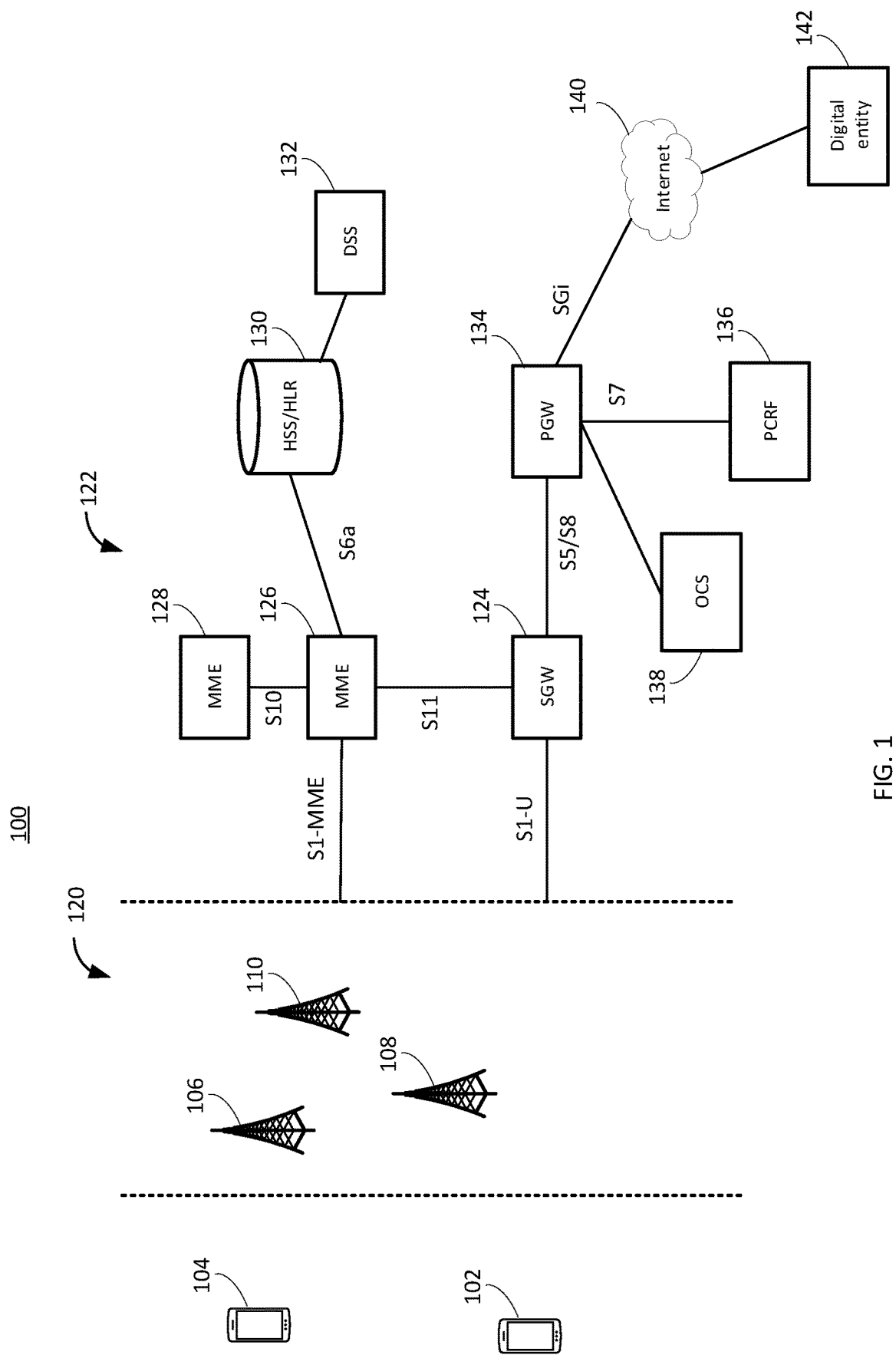
FIG. 1 is an simplified and exemplary block diagram of a cellular communication system in accordance with the current disclosure.

FIG. 1 is a block diagram illustrating a simplified and exemplary cellular communication system 100. The system 100 shown in FIG. 1 is loosely based on a 4G LTE system but the techniques described in this document apply to any generation system, including 5G or other small cell implementations. The system 100 may include a number of subscriber devices 102, 104. These subscriber devices may be smartphones but may also be tablets, laptops, vehicles, and Internet of Things devices, including but not limited to, appliances, home control and security systems, or commercial and industrial monitoring systems, to name a few.

An access network 120 may include various cell sites 106, 108, 110 each supporting a cell site of radio frequency coverage, referred to in 4G terminology as an evolved base station (eNodeB or eNB). Each cell site 106, 110, 114 may include one or more antennas, transmitters, receivers, and controller (not depicted). Each cell site can handle a plurality of different subscribers devices using directional antennas and often different frequencies.

Managing communication between subscriber devices and between a subscriber device and an external data networks (the outside world) 134, is a core network 122, called in the 4G LTE example, the evolved packet core (EPC). The core network 122 illustrated here is greatly simplified for the sake of clarity. A serving gateway (SGW) 124 may act as a router between cell sites 106, 110, 114 and the rest of traffic-oriented components. Mobility management entities (MMEs) 126, 128 manage signaling to the base stations including call set up and handoffs. A home subscriber server (HSS) 130 may be a central database that contains information about all the subscribers to the operator's communication system 100. A packet data gateway (PGW) 132 handles communication between subscriber devices 102, 104 and the outside world 134.

A policy server 136, known in the 4G example as a policy control and charging rules function (PCRF) is responsible for control decision-making and flow-based charging. In an embodiment, the policy server 136 instructs the PGW 132 to enforce the PCRF's decisions via a policy control enforcement function (PCEF, not depicted) which resides in the PGW 132. In the illustrated embodiment, an emergency cell site dataset 140 may be coupled to the policy server 136. An online charging system (OCS) 138 quota management, service wallets, and location and content-based charging, among others. The PGW 134 may interface with the outside world, such as the Internet 140, especially for communication between a subscriber device 104 and a digital entity 142 such as a website or other service.

Figure 2:
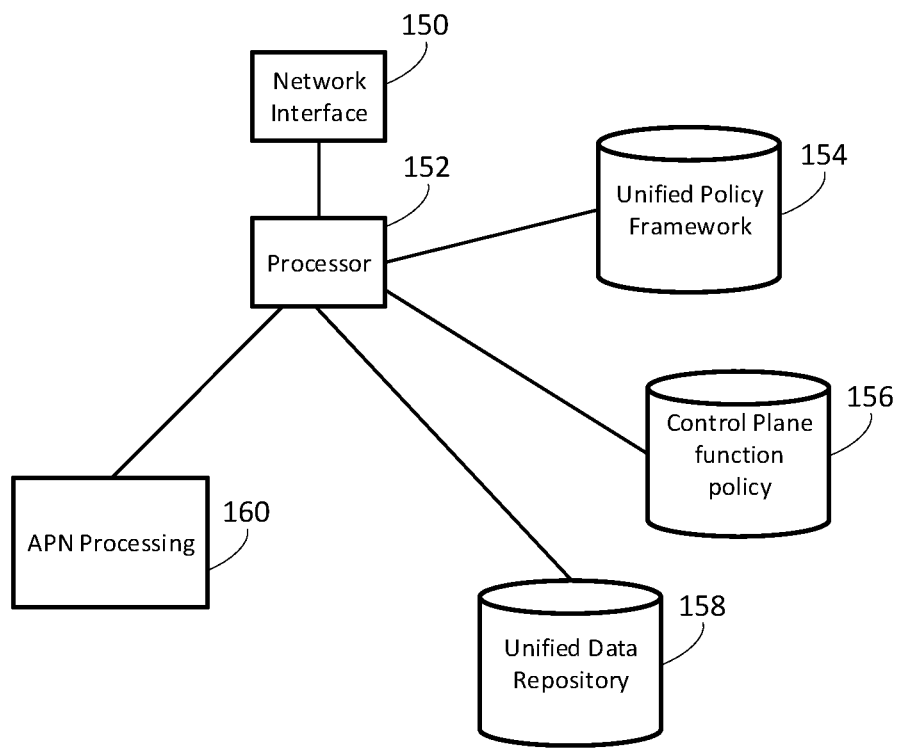
FIG. 2 is an simplified and exemplary block diagram of a policy control rule function in accordance with the current disclosure.

FIG. 2 is a block diagram of an exemplary PCRF 136. The PCRF 136 may include a processor 152 coupled to a network interface 150 that communicates with other system components as described above. The PCRF 136 may also include several databases such as a unified policy framework 154 and a control plane functional policy 156. A unified data repository 158 may be part of the PCRF 136 or may be a separate component in the system 100. An access point name (APN) processing block 160 may manage the selection of APNs for the purpose of directing session requests to an appropriate APN for the assignment of static IP addresses as discussed more below.

Table 1, below, illustrates a prior art feature table for an exemplary subscriber device. The table illustrates that different groups are authorized for various features supported by corresponding service types. As shown in this illustration, each feature is available via each of the 5 listed APNs.

TABLE 1

(PRIOR ART)

| Feature | APN | Service | User Group |
| --- | --- | --- | --- |
| Feature 1 | APN1 or APN2 or APN3 or APN4 or APN5 | service type 1 | Group A |
| Feature 2 | APN1 or APN2 or APN3 or APN4 or APN5 | service type 2 | Group A, Group D |
| Feature 3 | APN1 or APN2 or APN3 or APN4 or APN5 | service type 3 | Group A, Group B |
| Feature 4 | APN1 or APN2 or APN3 or APN4 or APN5 | service type 4 | Group C, Group D |
| Feature 5 | APN1 or APN2 or APN3 or APN4 or APN5 | service type 5 | Group A, B, C, D |

Figure 3:
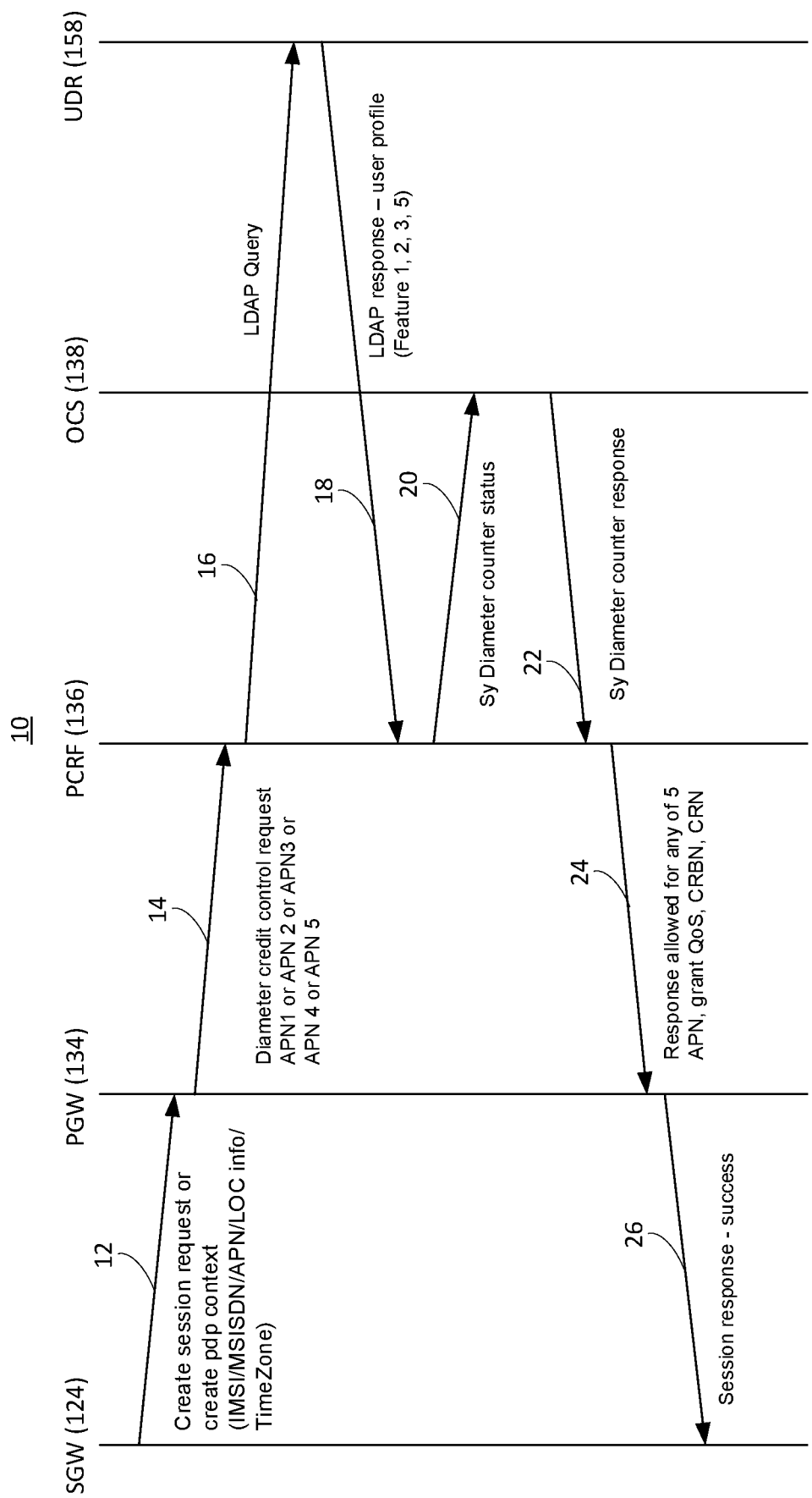
FIG. 3 is a prior art sequence diagram illustrating an existing session provisioning flow.

FIG. 3 is a sequence diagram illustrating a portion of a prior art session provisioning flow 10 in view of Table 1. As will be explained in more detail below, this illustration shows a user from Group A, (Table 1) as the exemplary requestor. The components illustrated in this diagram may include, as described above, the SGW 124, the PGW 134, the PCRF 136, the OCS 138, and the UDR 158. At step 12, a session request may be sent from the SGW 124 to the PGW 134, the session request including an equipment identifier (IMSI/MSISDN), an APN indicating a requested access point name, location information and time zone information. The PGW 134 may process the request and at step 14 generate a Diameter credit control request including all possible APNs available to the user and forward this request to the PCRF 136. The PCRF 136 may send, at step 16, a database query to the UDR 158 using, for example, a lightweight database access protocol (LDAP). The response to the query, at step 18 may include information from the user profile including what features are available to the user. In the case of a Group A requestor, the LDAP query returns Features 1, 2, 3, and 5 because Group A is not set up for Feature 4/Service type 4 (per Table 1). Steps 20 and 22 relate to a Diameter request to the billing system to determine if the user account has sufficient contractual terms to allow the user to access some or all of the features requested. That is, the response indicates whether the user's account has consumed its allocation of requested resources, such as total data packets, number of text messages, international call volume, etc.

Using the response at step 22, the PCRF 136 may generate an authorization message indicating approval for the request including the use of all available APNs, setting a quality of service level, and providing a charging rule base name (CRBN) and a charging rule name (CRN). Referring to Table 1, it can be seen that each of the five features operate with a corresponding service type and are supported on any of the five APNs. Different combinations of user groups are supported for the various features. As shown, only Group A is authorized for Feature 1, while Group A is not authorized for Feature 4. As discussed above, the LDAP response at step 18 includes only features 1, 2, 3, and 5.

A problem arises if there is a need to restrict Group A to use only APN 5, for example, so that the required static IP address from APN 5's IP address pool is available to the user. The solution discussed and described below supports such restrictions without requiring user configuration changes to the HSS/HLR 130 or PCRF 136.

Figure 4:
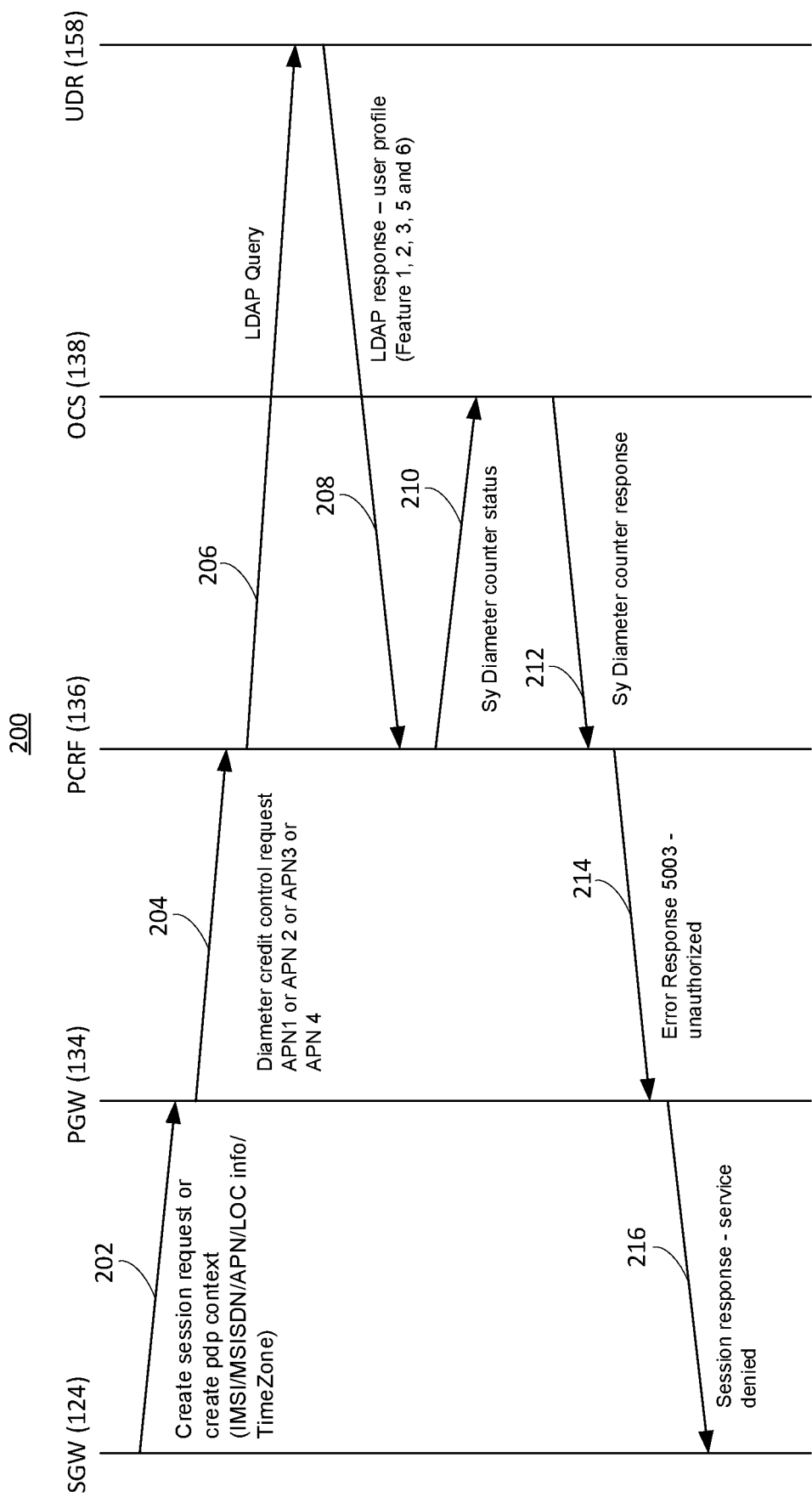
FIG. 4 is a sequence diagram illustrating a provisioning flow in accordance with the current disclosure.
Figure 5:
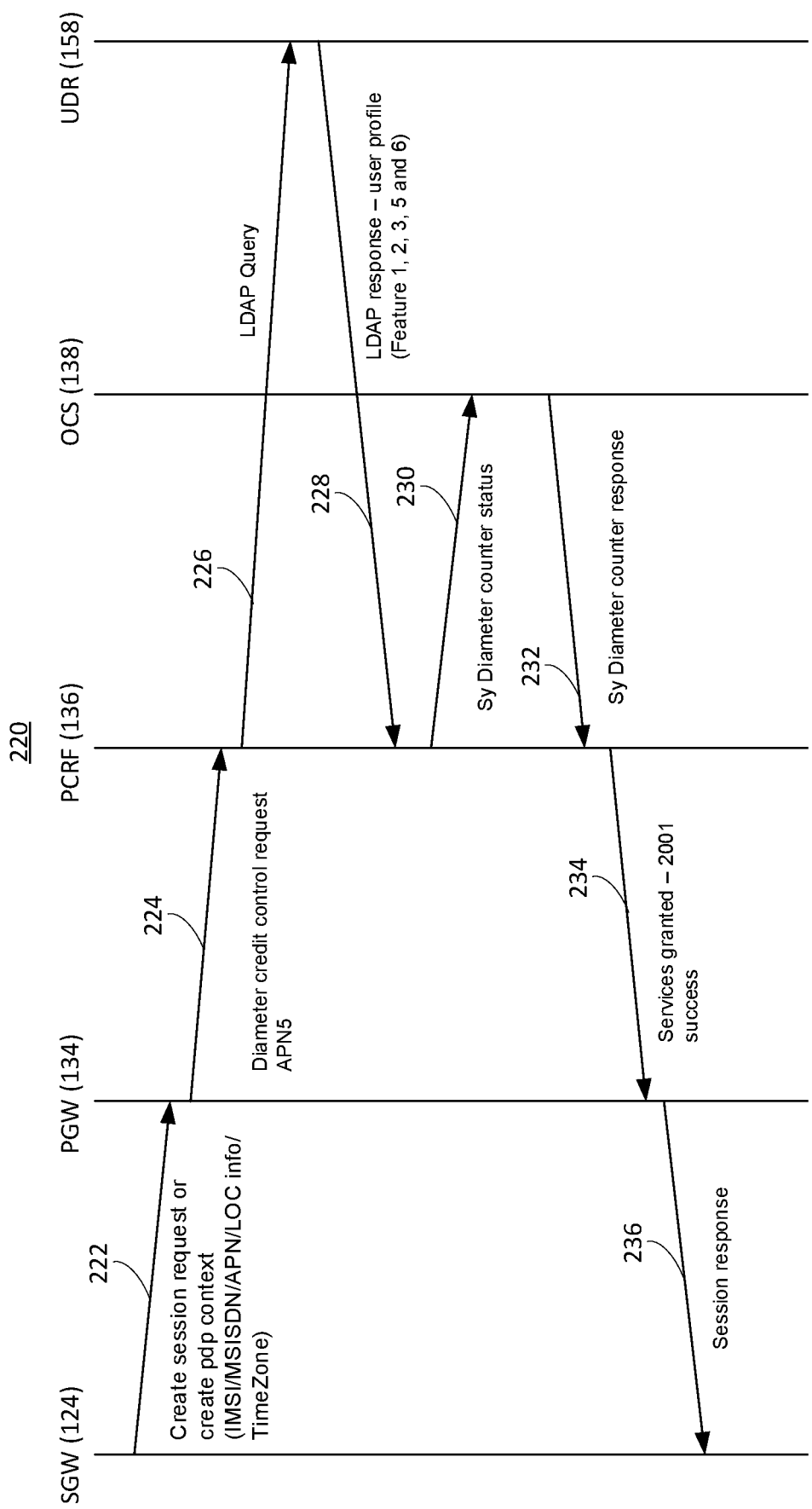
FIG. 5 is a sequence diagram illustrating another case of the provisioning flow of FIG. 4.

FIG. 4 and FIG. 5 in conjunction with Table 2 illustrate a first technique for accomplishing the restriction of a user or user group to a particular APN without configuration changes to the HSS/HLR 130 or PCRF 134, once the PCRF 134 is updated to include the ability to process Feature 6 as discussed below.

TABLE 2

| Feature | APN | Service | User Group |
| --- | --- | --- | --- |
| Feature 1 | APN1 or APN2 or APN3 or APN4 or APN5 | service type 1 | Group A |
| Feature 2 | APN1 or APN2 or APN3 or APN4 or APN5 | service type 2 | Group A, Group D |
| Feature 3 | APN1 or APN2 or APN3 or APN4 or APN5 | service type 3 | Group A, Group B |
| Feature 4 | APN1 or APN2 or APN3 or APN4 or APN5 | service type 4 | Group C |
| Feature 5 | APN1 or APN2 or APN3 or APN4 or APN5 | service type 5 | Group A, B, C, D |
| Feature 6 | If APN is not equal to APN 5 | Service block all | Group A |

As shown in Table 2, a new data row has been added specifying a Feature 6 supporting all service types restricted to Group A. Referring to FIG. 4, a sequence diagram illustrating a portion of a session provisioning flow 200 is discussed and described. In this embodiment, the request is made for an APN that will not support the static IP address required by the user in user group A, that is, the request at step 202 and subsequent Diameter credit control request at step 204 include one or more APNs that do not include APN 5. As discussed above, for this illustration APN 5 is the APN required to supply the needed static IP address. Continuing, the LDAP query at step 206 returns, at step 208, features 1, 2, 4, 5, and the newly provisioned feature 6. After confirming availability at steps 210 and 212, execution may return to the PCRF 136. At the PRCR 136, Feature 6 may be given a higher priority level than each other feature, so that Feature 6 is checked and applied first at the PCRF 136. As can be seen in Table 2, Feature 6 includes only Group A and blocks all service types if the APN is not equal to APN 5. That is, a request from a user in Group A for APN 4 (or any APN 1-4) will block all services for the request, as shown at step 214. Subsequently, the PGW 134 will deny the service request from the SGW 124. However, if a user from, for example, user Group B is processed, Feature 6 will not be processed and execution will proceed normally, as discussed above with respect to FIG. 1.

Turning to FIG. 5, another request from a user in Group A is illustrated in the same fashion as the request shown in FIG. 4, except that in this case the request (at 224) is for APN 5. Execution proceeds through steps 222, 224, 226, 228, and 230 in the same manner as steps 202-212 of FIG. 4. The PCRF 136, upon receipt of the Diameter response processes the information in Table 1, starting with Feature 6. In this case, the APN is equal to APN 5 so that Feature 6 is not allowed and processing continues to the other authorized features 1, 2, 3, and 5. That is, all normally authorized services are available to the user. Step 234 grants the services requested and the session authorization response is passed to the SGW 124 at step 236. Because only APN 5 is available to the user, the user will receive the required static IP address from the APN 5 IP address pool.

Figure 6:
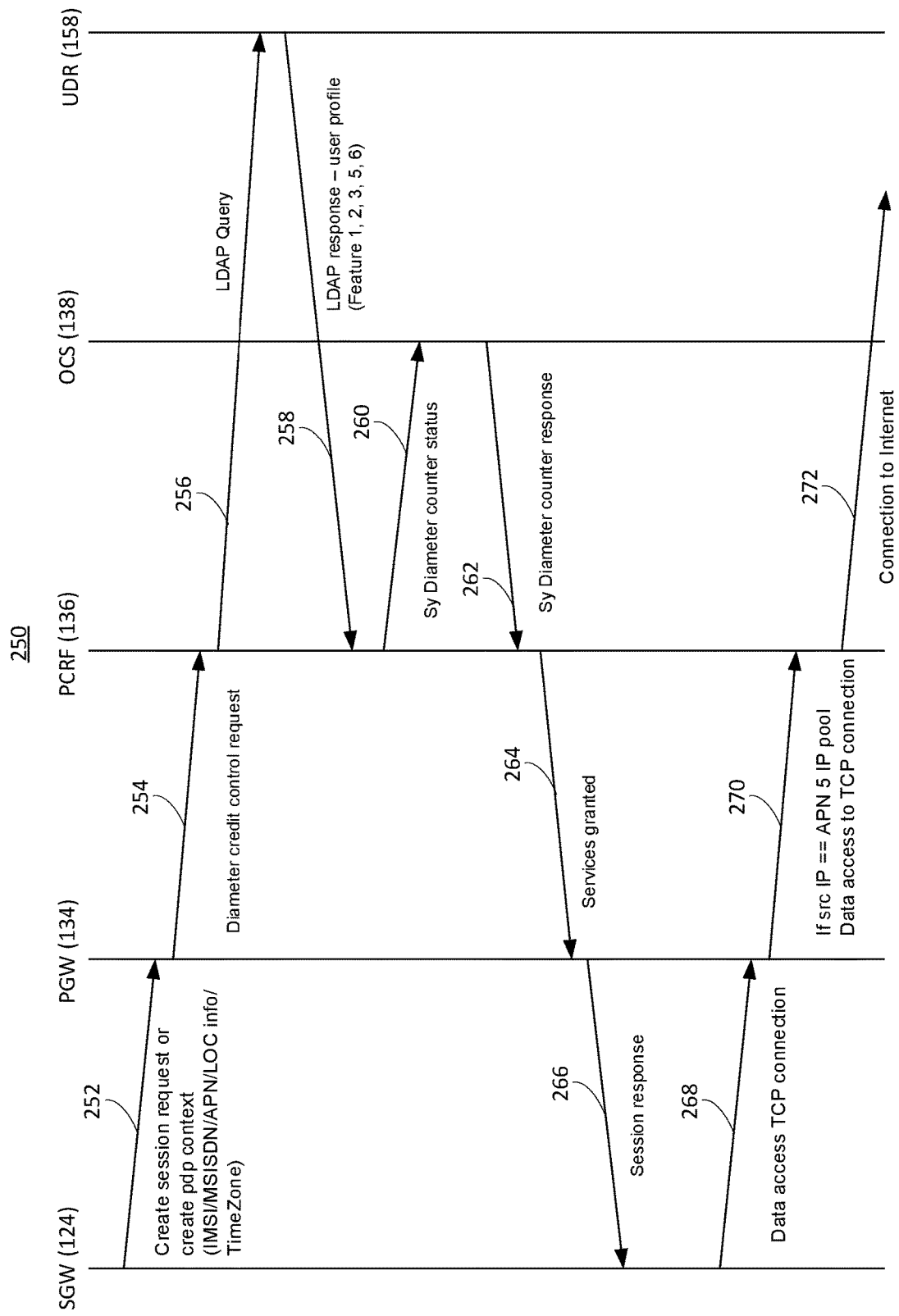
FIG. 6 is a sequence diagram illustrating an alternative provisioning flow in accordance with the current disclosure.
Figure 7:
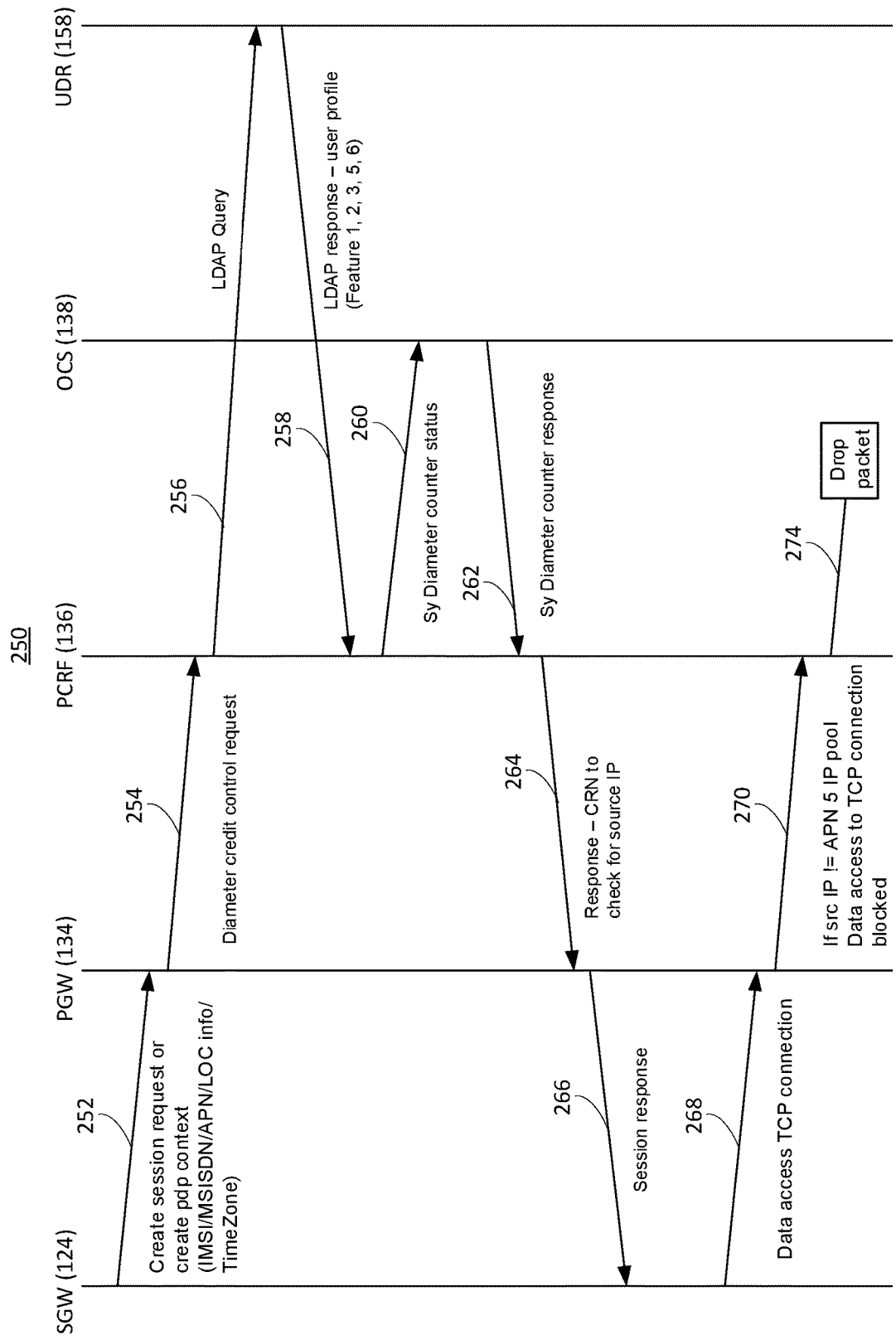
FIG. 7 is a sequence diagram illustrating another case of a provisioning flow of FIG. 6.

FIG. 6 and FIG. 7 illustrate, conjunction with Table 3 illustrate a second technique for accomplishing the restriction of a user or user group to a particular APN.

TABLE 3

| Feature | APN | Service | User Group |
| --- | --- | --- | --- |
| Feature 1 | APN1 or APN2 or APN3 or APN4 or APN5 | service type 1 | Group A |
| Feature 2 | APN1 or APN2 or APN3 or APN4 or APN5 | service type 2 | Group A, Group D |
| Feature 3 | APN1 or APN2 or APN3 or APN4 or APN5 | service type 3 | Group A, Group B |
| Feature 4 | APN1 or APN2 or APN3 or APN4 or APN5 | service type 4 | Group C |
| Feature 5 | APN1 or APN2 or APN3 or APN4 or APN5 | service type 5 | Group A, B, C, D |
| Feature 6 | If APN is not equal to APN 5 | CRN = APN5 only | Group A |

In this embodiment, the assumption is made that each APN (APN 1, APN 2, APN 3, APN 4, APN 5) is using a different IP address pool or at least that the APN that needs to be allowed, in this example APN 5, is using a unique address pool.

This embodiment takes advantage of the notion that the PGW 134 (or authentication, authorization, and account (AAA) in some systems) will allot an IP address assigned for the requested APN at the time of the request. In this case, a rule may be developed that if the user source IP address is identically equal to an IP address in the desired APN IP pool, packets for the session should be allowed. If, on the other hand, the user source IP address is not equal to an address in desired APN IP address pool, packets for the session should be dropped.

Table 3, above, illustrates a different Feature 6 that embodies this rule, showing that the CRN=APN5 only for Group A, where CRN is charging rule name supplied by the PCRF 136 to the PGW 134. Referring to FIG. 6, the session request may be made at step 252 similar to other session requests discussed above. The steps 254, 256, 258, 260, and 262 are processed as above. For this example, the initial request is for APN 5 on Group A, so at the PCRF 134, Feature 6 is not processed and the other features may be processed in a normal fashion, resulting in services being granted at steps as above in FIG. 5 at steps 264 and 266 and access established in steps 268, 270, and ultimately at step 272, to the Internet or other outside data source.

FIG. 7 shows an alternate flow 250 where the session request is from Group A but the APN is not APN 5. In this case, the steps 252, 254, 256, 258, 260, and 262 are the same as corresponding steps in FIG. 6. At the PCRF 136, Feature 6 is processed for Group A resulting in a service being set for a CRN to check for an IP address from the APN 5 IP address pool at step 264. When this is received at the PGW 134, an authorization is passed to the SGW 124 at step 266. Subsequently the SGW 124 provides a TCP connection at step 268. At the PGW 134, the IP address of the data packet is checked and given the assumptions about the uniqueness of the APN 5 IP address pool, the source IP address will not match the APN 5 IP address pool. The connection will be blocked and at step 274, the data packet may simply be dumped.

At least one technical effect is the rapidly and simply change the configuration of the cellular network by simply adding a feature to the PCRF 136, avoiding prior art requirements to change individual user accounts. This greatly simplifies feature provisioning and de-provisioning such as support for static IP addresses.

The current system and method benefit both users and system providers by allowing more flexibility in managing APN requirements such as static IP address assignment.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of selectively restricting a user to an access point name (APN) related to a static internet protocol (IP) address in a cellular communication network, the method comprising:
   identifying a first APN to which all traffic from the user should be routed;
   at a policy control rule function (PCRF), checking an indicia related to the APN in a communication from the user, wherein the indicia comprises a first field containing the first APN in a Diameter credit control request received at the PCRF, wherein the PCRF requests a list of features authorized for the user, wherein the list of features identifying each APN authorized for the user according to the feature;
   wherein checking the indicia comprises identifying a feature in the list of features that restricts the user to the first APN;
   allowing communication with the user responsive to the indicia matching the criteria; and
   blocking communication with the user responsive to the indicia not matching the criteria.

2. The method of claim 1, wherein allowing communication with the user comprises allowing data traffic between the user and an external resource responsive to the indicia matching a criteria for the static IP address.

3. The method of claim 1, wherein blocking communication with the user comprises blocking communication between the user and an external resource responsive to the indicia not matching the criteria for the static IP address.

4. The method of claim 1, wherein the indicia is an internet protocol (IP) address of a communication from the user and wherein checking the indicia comprises determining that the IP address of the communication from the user is from a pool of IP addresses associated with the first APN.

5. A computerized method of selectively restricting a user to an access point name (APN) related to a static internet protocol (IP) address in a cellular communication network, the computerized method comprising:
identifying a first APN to which all traffic from the user should be routed;
at a policy control rule function (PCRF), checking an indicia related to the APN in a communication from the user, wherein the indicia comprises an internet protocol (IP) address of a communication from the user, wherein checking the indicia comprises determining that the IP address of the communication from the user is from a pool of IP addresses associated with the first APN;
allowing communication with the user responsive to the indicia matching the criteria; and
blocking communication with the user responsive to the indicia not matching the criteria.

6. The computerized method of claim 5, wherein the indicia further comprising a first field containing the first APN in a Diameter credit control request received at the PCRF.

7. The computerized method of claim 6, wherein the PCRF requests a list of features authorized for the user, the list of features identifying each APN authorized for the user according to the feature.

8. The computerized method of claim 7, wherein checking the indicia comprises identifying a feature in the list of features that restricts the user to the first APN.

9. The computerized method of claim 5, wherein allowing communication with the user comprises allowing data traffic between the user and an external resource responsive to the indicia matching a criteria for the static IP address.

10. The computerized method of claim 5, wherein blocking communication with the user comprises blocking communication between the user and an external resource responsive to the indicia not matching the criteria for the static IP address.

11. A computerized method of selectively restricting a user to an access point name (APN) related to a static internet protocol (IP) address in a cellular communication network, the computerized method comprising:
identifying a first APN to which all traffic from the user should be routed;
at a policy control rule function (PCRF), checking an indicia related to the APN in a communication from the user, wherein the indicia comprises a first field containing the first APN in a Diameter credit control request received at the PCRF, wherein the PCRF requests a list of features authorized for the user, wherein the list of features identifying each APN authorized for the user according to the feature; wherein checking the indicia comprises identifying a feature in the list of features that restricts the user to the first APN;
wherein the indicia further comprises an internet protocol (IP) address of a communication from the user and wherein checking the indicia comprises determining that the IP address of the communication from the user is from a pool of IP addresses associated with the first APN;
allowing communication with the user responsive to the indicia matching the criteria; and
blocking communication with the user responsive to the indicia not matching the criteria.

12. The computerized method of claim 11, wherein the determining comprises determining that the IP address of the communication from the user is from a pool of IP addresses associated with the first APN where the indicia comprises the IP address.

13. The computerized method of claim 11, wherein the PCRF obtains a list of features authorized for the user, wherein the list of features identifying each APN authorized for the user according to the feature.

14. The computerized method of claim 13, wherein the determining comprises identifying a feature in the list of features that restricts the user to the first APN wherein the indicia comprises the first field containing the first APN in a Diameter credit control request received at the PCRF.

15. The computerized method of claim 11, wherein approving communication with the user comprises approving data traffic between the user and an external resource responsive to the indicia matching a criteria for the static IP address.

16. The computerized method of claim 11, wherein denying communication with the user comprises denying communication between the user and an external resource responsive to the indicia not matching the criteria for the static IP address.

* * * * *